US008577663B2

(12) United States Patent
Lu et al.

(10) Patent No.: US 8,577,663 B2
(45) Date of Patent: Nov. 5, 2013

(54) SYSTEM AND METHODS FOR FAULT-ISOLATION AND FAULT-MITIGATION BASED ON NETWORK MODELING

(75) Inventors: Tsai-Ching Lu, Wynnewood, PA (US); Yilu Zhang, Northvlle, MI (US); Alejandro Nijamkin, Simi Valley, CA (US); David L. Allen, Thousand Oaks, CA (US); Hankyu Moon, Oak Park, CA (US); Mutasim A. Salman, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 160 days.

(21) Appl. No.: 13/113,835

(22) Filed: May 23, 2011

(65) Prior Publication Data

US 2012/0303348 A1 Nov. 29, 2012

(51) Int. Cl.
*G06F 17/50* (2006.01)
(52) U.S. Cl.
USPC ..................................... 703/13; 703/2; 703/6
(58) Field of Classification Search
None
See application file for complete search history.

(56) References Cited

U.S. PATENT DOCUMENTS

2009/0012760 A1* 1/2009 Schunemann ..................... 703/6
2012/0137367 A1* 5/2012 Dupont et al. .................. 726/25

OTHER PUBLICATIONS

Barthelemy, "Betweenness centrality in large complex networks", The European Physical Journal B—Condensed Matter and Complex Systems, Mar. 2004, vol. 38, Issue 2, pp. 163-168.*

Maglaras et al., "New Metrics for Characterizing the Significance of Nodes in Wireless Networks via Path-Based Neighborhood Analysis", 13th Panhellenic Conference on Informatics, Sep. 2009, pp. 143-147.*

Struss Peter, Special Issue on Model-Based Diagnostics, IEEE Transactions on Systems, Man, and Cybernetics Part A. Sep. 2010 vol. 40, No. 5.

Wang Jun, A Benchmark Diagnostic Model Generation System, IEEE Transactions on Systems, Man, and Cybernetics Part A, Sep. 2010, vol. 40, No. 5.

Simonot-Lion Francoise, Guest Editorial Special Section on In-Vehicle Embedded Systems, IEEE Transactions on Industrial Informatics, Nov. 2009, vol. 5, No. 4.

Zeng Haibo, Stochastic Analysis of CAN-Based Real-Time Automotive Systems, IEEE Transactions on Industrial Informatics, Nov. 2009, vol. 5, No. 4.

(Continued)

*Primary Examiner* — Omar Fernandez Rivas
*Assistant Examiner* — Herng-Der Day
(74) *Attorney, Agent, or Firm* — John A. Miller; Miller IP Group, PLC

(57) ABSTRACT

A system and method for identifying a monitoring point in an electrical and electronic system (EES) in a vehicle. The method includes defining a network model of the EES where potential monitoring point locations in the model are identified as targets, such as nodes. The method then computes a betweenness centrality metric for each target in the model as a summation of a ratio of a number of shortest paths between each pair of targets in the model that pass through the target whose betweenness centrality metric is being determined to a total number of shortest paths between each pair of targets. The method identifies which of the betweenness centrality metrics are greater than a threshold that defines a minimum acceptable metric and determines which of those targets meets a predetermined model coverage. The monitoring point is selected as the target that best satisfies the minimum metric and the desired coverage.

19 Claims, 2 Drawing Sheets

(56) References Cited

OTHER PUBLICATIONS

Brandes Ulrik, A Faster Algorithm for Betweeness Centrality, University of Konstanz, Dept. of Computer & Information Science. 2008.

Borgatti Stephen, A Graph-Theoretic Perspective on Centrality, Article in Press Science Direct. 2005.
Flom Peter, A New Measure of Linkage Between Two Sub-Networks, Connections-Web, 2004, vol. 26-1/6, 62-70.
Freeman Linton, Centrality in Social Networks Conceptual Clarification, Social Networks, 1978/79, 215-239.

* cited by examiner

SYSTEM AND METHODS FOR FAULT-ISOLATION AND FAULT-MITIGATION BASED ON NETWORK MODELING

BACKGROUND OF THE INVENTION

1. Field of the Invention

This invention relates generally to defining a data monitoring point in a system for integrated fault-isolation and fault-tolerance analysis of an in-vehicle embedded electrical and electronic system (EES) and, more particularly, to a system and method for defining a data monitoring point for integrated fault-isolation and fault-tolerance analysis of an in-vehicle embedded EES that includes defining the EES as a network model, calculating a betweenness centrality metric for each potential monitoring point in the model, ranking the betweenness centrality metrics and selecting the potential monitoring point with the highest betweenness centrality metric as the actual monitoring point if it satisfies a predetermined coverage defined by a degree of neighbor factor.

2. Discussion of the Related Art

Modern vehicles are complex electrical and mechanical systems that employ many components, devices, modules, sub-systems, etc., such as embedded electrical and electronic systems (EES), that pass electrical information between and among each other using sophisticated algorithms and data buses. Vehicle EESs are becoming much more complex as they have evolved in response to a continuously increasing demand for incorporating electronic and electrical control units (ECUs) into vehicles. For example, a modern high end vehicle may include seventy or more ECUs to provide control and command operations for the EESs on the vehicle. These control units allow for advanced safety, convenience and comfort features, as well as meeting new emissions and fuel-economy standards. However, the fast growing number of ECUs and their peripherals on a vehicle has led to complex interactions that sometimes cause unexpected behaviors, such as emerging or cascading failures.

As with anything, EESs and ECUs are susceptible to errors, failures and faults that could affect the operation of the vehicle. The algorithms operating in the ECUs generate information and calculations from data stored in memory. Further, signals may be transferred between ECUs along wiring to cause certain operations to be performed, such as actuating an actuator. All of this information could be corrupted in some fashion, such as a result of loose wiring, memory failure, calculation inaccuracies, etc. Thus, the transfer of data or messages between different elements in the system, whether it is along a physical wire or within software, can be used to determine faults. Furthermore, the current techniques employed in integrated vehicle health management (IVHM) and active safety systems are still lacking in standardization and metrics for addressing the needs for improving and quantifying maintainability and complexity in the EESs.

When such errors and faults occur, often the affected device or component will issue a fault code, such as diagnostic trouble code (DTC), that is received by one or more system controllers identifying the fault, or some ancillary fault with an integrated component. In order to be able to detect and analyze DTCs and other faults, it is necessary to collect data that is required to identify and isolate the faults, and collect the data at the proper location. Once the data is collected, diagnostic algorithms are employed to analyze and process the data and provide it in a format that can be analyzed. Once the data has been processed, then the root cause of the fault can be identified. For example, DTCs can be analyzed by service technicians and engineers to identify problems and/or make system corrections and upgrades. Diagnostic modeling includes determining the root cause of a problem that has already occurred. Known fault modeling methods for diagnosing component and sub-system faults may use Bayesian networks, dynamic Bayesian networks, hidden Markov models, fuzzy logic, belief networks, Petri net, etc.

Sometimes sensors are provided to collect the data at the desirable locations in the EES and/or ECUs to provide the information necessary to be used by the diagnostic algorithm to identify the cause of a problem. Further, especially in sophisticated vehicles, the data collection often includes monitoring messages and other information transmitted between the ECUs. The data and information being collected may be messages transmitted between the ECUs or data available in a particular memory in an ECU. Although it may be desirable on some level to provide monitoring points at every possible location to collect sufficient data to clearly identify a problem, such a scheme is impractical and ultimately too costly. Therefore, it is necessary to identify the best monitoring points that will provide the most usable information. Known techniques for identifying the best monitoring points in and between an EES and/or ECUs has heretofore been limited.

SUMMARY OF THE INVENTION

In accordance with the teachings of the present invention, a system and method for identifying a monitoring point in an electrical and electronic system (EES) in a vehicle is disclosed that is part of a system for providing fault isolation and mitigation analysis of the EES. The method includes defining a network model of the EES where potential monitoring point locations in the model are identified as targets, such as nodes. The method then computes a betweenness centrality metric for each target in the model as a summation of a ratio of a number of shortest paths between each pair of targets in the model that pass through the target whose betweenness centrality metric is being determined to a total number of shortest paths between each pair of targets. The method identifies which of the betweenness centrality metrics are greater than a threshold that defines a minimum acceptable metric and determines which of those targets meets a predetermined model coverage. The monitoring point is selected as the target that best satisfies the minimum metric and the desired coverage.

Additional features of the present invention will become apparent from the following description and appended claims, taken in conjunction with the accompanying drawings.

DETAILED DESCRIPTION OF THE EMBODIMENTS

Figure 1:
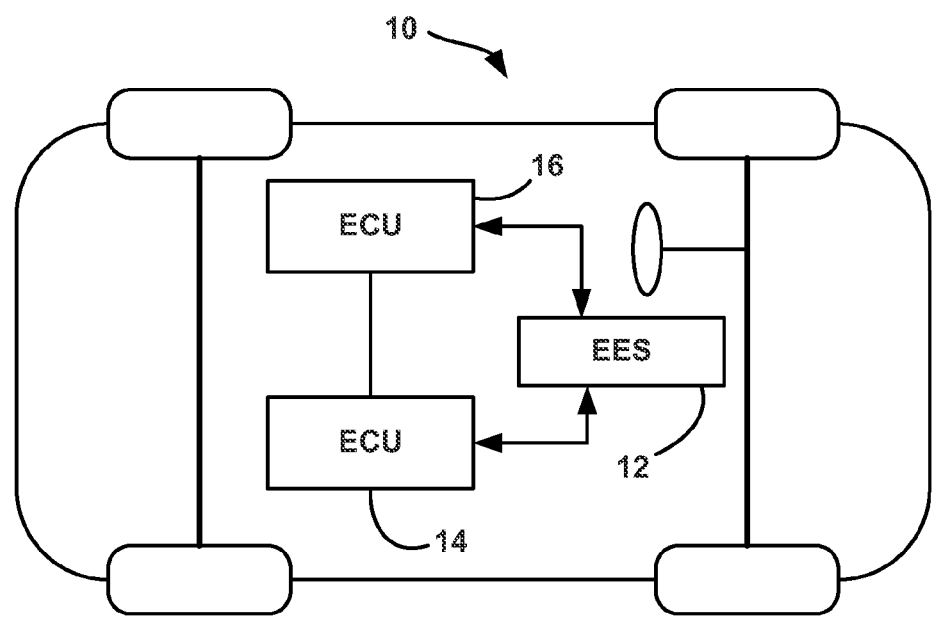
FIG. 1 is a simplified illustration of a vehicle including an EES and ECUs.

The following discussion of a system and method for selecting a data monitoring point in a network model of a vehicle EES using a betweenness centrality metric is merely exemplary in nature, and is in no way intended to limit the invention or its applications or uses. For example, as mentioned, the present invention has particular application for an EES on a vehicle. However, as will be appreciated by those skilled in the art, the system and method of the present invention will have application for other systems other than vehicle systems.

The present invention proposes a system and method for selecting a data monitoring point in a network model of a vehicle EES for an integrated fault-isolation and mitigation analysis (FIMA) system. The input to the system is the network model that may be a layered network that represents physical, structural, functional and data-flow features of the EES. Each layer in the network provides one aspect of the EES, for example, a physical network layer represents physical wiring connections of ECUs, a functional network layer represents relations between ECUs and virtual devices in virtual networks, etc. Nodes in the network can be annotated with node attributes, for example, an ECU may be represented as two nodes, where one node is associated with the node attribute "sending," and the other with "receiving" in the message network. The nodes can be annotated with node types, for example, in a message network. ECUs are represented as nodes with node type "ECU," whereas messages are represented as nodes with node type "Message." Designating a node type leads to node partitions, where the nodes in the same partitions do not have edges, for example, one ECU node is not directly linked to another ECU node, but via message nodes in the message network. Edges can be annotated with edge attributes where the value of an attribute typically represents the flows of information between nodes. Edges in the network may link nodes across different layers.

The system employs a multi-partite and/or a multi-attribute betweenness centrality metric that quantifies complexity and maintainability at the distribution of the importance of a node in the layered network, which holistically models complex interactions among layers of power supply, wiring, sensing, control and communications in the EES. A betweenness centrality metric is a known feature from the emerging field of network sciences, and is used to identify the importance of the nodes and edges in the network, where the importance is ranked to determine which nodes and edges will be the monitoring points. The system uses the betweenness centrality metric to provide random and usage-based failure strategies to simulate emerging and cascading failure scenarios, and recommends fault detection and isolation monitoring points for a desired diagnostic coverage.

The purpose of the system and method for selecting a data monitoring point is to address the need for quantifying complexity and maintainability in the growing complex interactions of the EES, and to increase fault-isolation and fault-mitigation analysis capability. Vehicle EESs have become very complicated in response to a continuously increasing demand for incorporating ECUs into a vehicle. The root cause of EES failures is likely to have an effect across network layers of the EES ranging from electrical power supply, physical wire connections, functional relationships between software components, messaging, sensing, control and data flow over the network. The current state-of-the-art analysis techniques are generally single layered systems that focus on one single application domain, such as end-to-end latency analysis for a CAN, which is important by its merits, but is lacking in addressing problems rooted in other layers of the EES network.

The system quantifies the importance to which a node or edge has control over pair-wise connections between other nodes or edges that reside in the same or different parts of the EES. In other words, the betweenness centrality metric quantifies the importance to which a node or edge has control over pair-wise connections between other nodes that have the same or different attributes. The system uses the multi-partite and/or multi-attribute betweenness centrality metrics to rank and recommend fault isolation and monitoring points that cannot be discovered by single layered analysis techniques in conventional betweenness centrality metrics. The system provides usage-based and random failure simulation strategies for recommending fault detection, isolation mitigation points for a desired diagnostic coverage. The system considers the EES as an embedded and distributed complex system that is subject to the design for fault detection, isolation and mitigation. The system employs an approach failure simulation with a novel family of a betweenness centrality metric to address usage-based and random failures in the EES. The system is capable of recommending monitoring points for fault-isolation and potential implementation of fault-mitigation for different failure scenarios.

FIG. 1 is an illustration of a vehicle 10 including an embedded EES 12 and ECUs 14 and 16 that pass data, messages and other information between each other. The ECUs 14 and 16 may be part of or separate from the EES 12. Every vehicle will have a different configuration of EESs and ECUs, where the EESs will transmit messages between each other and to and from the various ECUs, and where each EES and ECU will operate various algorithms so that the vehicle systems can communicate with each other and cause certain operations to be performed in a desirable manner. Monitoring points for collecting messages and data stored and transferred between the EES 12 and the ECUs 14 and 16 will be determined as part of a diagnostic analysis algorithm to perform fault identification. Each ECU 14 and 16, EES 12 or some software element within the ECUs 14 and 16 or the EES 12 is defined herein as a node and communications or connections between the ECUs 14 and 16 and the EES 12 are defined as edges, where the monitoring points can be a particular one of those nodes or edges, and the data and information that passes through the node or edge is collected as part of the diagnostic trouble shooting. Particularly, the nodes can be the physical ECUs or a particular software component within the ECUs, and the edges can be the physical wires between the EESs 12 and/or the ECUs 14 and 16, or function calls between software components.

Figure 2:
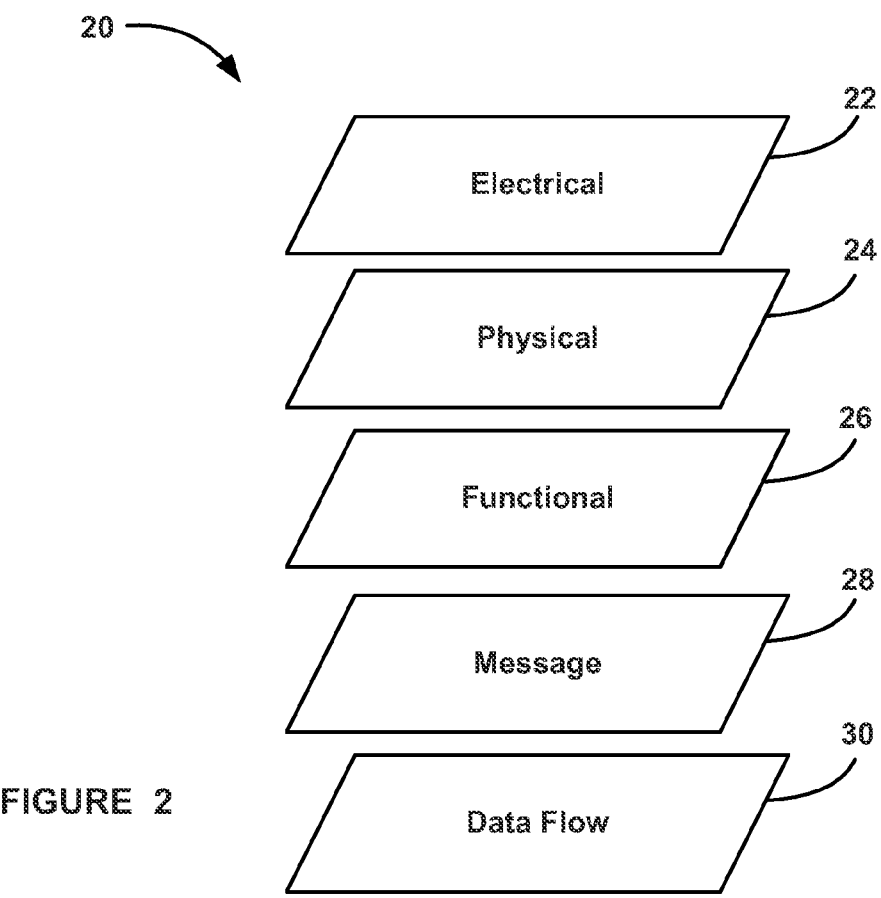
FIG. 2 is a perspective view of a layered network model of an EES.

FIG. 2 is a representative network model 20 of the EES 12 that includes layers of networks, where each layer corresponds to an aspect of electrical, wiring, communications and data flow for the EES 12. The network model 20 for the EES 12 includes a lower electrical network layer 22 representing power distribution relationships, a physical network layer 24 representing wiring relationships in the ECUs 14 and 16, a functional network layer 26 representing ECU virtual network relationships, a message network layer 28 representing ECU message relationships and a data flow network layer 30 representing task, feature, message and signal sequences. The layered in-vehicle EES network model 20 has several unique characteristics that produce novel betweenness centrality metrics, as discussed herein, to quantify the complex interactions in the EES 12.

As will be discussed in detail below, each layer 22-30 outputs a ranked list of recommended fault detection and isolation monitoring points and simulation results for fault isolation and mitigation analysis of the EES 12. The betweenness centrality metric referred to above is used to identify the importance of the nodes and/or edges in the model 20, and that importance is ranked to determine which of those nodes and/or edges will be the monitoring points. The betweeness centrality metric can be applied across the layers 22-30, and there could be a ranked list of recommended fault detection and isolation monitoring points and simulation results for each layer 22-30 as well as a ranked list for considering all of the layers 22-30 together.

The betweenness centrality metric is discussed herein in the context of an undirected graph. However, the betweenness centrality metric can also be applicable to directed graphs, such as function calls in ECU software, by considering the shortest path following the directed edges in the graph. An undirected graph G=(N, E) consists of a non-empty countable set of nodes N and a set of edges E⊂N×N. The undirected graph G is a graph where the nodes $\overline{N}$ are divided into non-empty disjointed subsets, where no two nodes N of the same subset have an edge connecting them. The nodes N in the graph G can be associated with a vector of node attributes $A_N$ and, similarly, edges can be associated with a vector of edge attributes $A_E$. A part is imposed by a topological structure, whereas an attribute is primarily augmented for the semantic aspect of a node. For the layered EES network model 20, node types typically correspond to parts.

Figure 3:
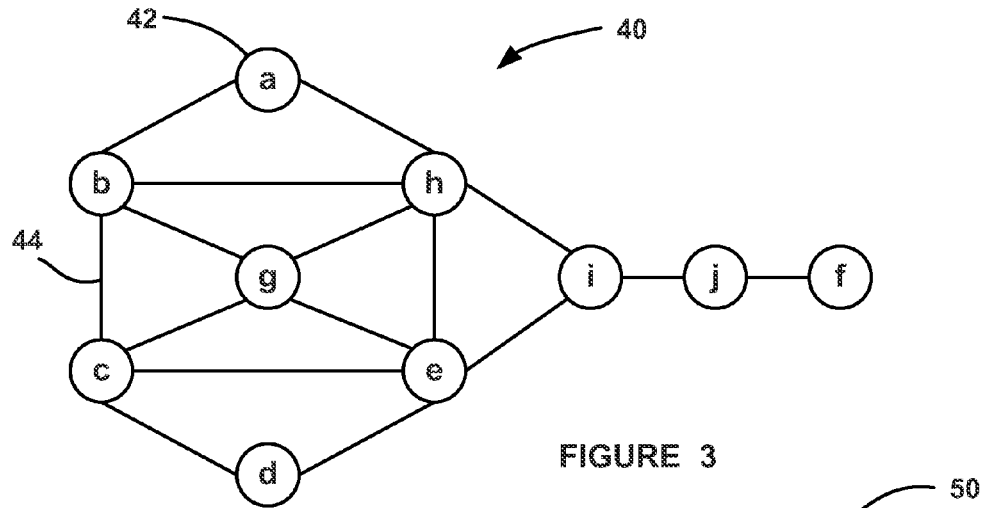
FIG. 3 is an example of a node structure that identifies data flow between various nodes in the layered network model.

FIG. 3 is an illustration of a node structure 40 as a type of undirected graph that can be representative of the defined nodes and edges in the EES 12 and/or the ECUs 14 and 16, or a portion of the node structure in those components. The node structure 40 includes a plurality of nodes 42, where each of the nodes 42 is identified by a letter a-j. Each node 42 could be a monitoring point for gathering data and/or messages for fault detection, as discussed above. The node structure 40 includes a plurality of connections or edges 44 between the nodes 42 representing the flow of information and data between the nodes 42 in the structure 40. The edges 44 are a direct connection between two of the nodes 42. A path from one node 42 to another node 42 may include a single one of the edges 44 or may include multiple edges 44. As will be discussed in detail below, the betweenness centrality metric is used to identify or quantify the importance of each of the nodes 42 and the edges 44 in the structure 40 to determine whether a particular node or nodes 42, or edge or edges 44, will be a monitoring point.

For the discussion below, the betweenness centrality metric will be determined for the nodes 42 to determine which of the nodes 42 has the highest metric and is most suitable to be a monitoring point. However, as well be appreciated by those skilled in the art, the edges 44 can also be monitoring points and the betweenness centrality metric can be determined for the edges 44 in the same manner. The betweenness centrality metric can be one or both of a multi-partite metric or a multi-attribute metric, both discussed below. The betweenness centrality metric is determined as a summation of a ratio between the total number of the shortest paths between two of the nodes 42 and the number of those shortest paths that pass through the particular node 42 whose betweenness centrality metric is being determined, which will be discussed in more detail below. In the example shown for the node structure 40, it may appear that node g is an important node in the structure 40 because it receives information from many of the other nodes 42, particularly nodes b, c, h and e. However, node i is actually the most important node in the structure 40 because information that passes through the structure 40 must always go through node i, and not necessarily node g. In other words, if node i was removed from the structure 40, then there would be a complete break between node j and nodes a-h in the structure 40, which would not be true if node g was removed.

The betweenness centrality metric for each of the nodes 42 in the structure 40 is determined, and those values are compared or ranked to determine the highest betweenness centrality metric of the nodes 42 that will be used as the monitoring point in the structure 40. The betweenness centrality metric based on the discussion herein will be the highest for node i, and it will be the most suitable monitoring point for the structure 40.

Once the nodes 42 with a betweenness centrality metric above a certain minimum betweenness centrality threshold are identified, the coverage of those nodes 42 in the structure 40, i.e., how close a particular node is to the greatest number of other nodes, defined as a degree of neighbor factor, is calculated to determine whether it is a suitable candidate for the monitoring point based on its proximity to all of the other nodes 42 in the structure 40. For example, the algorithm may define the degree of neighbor factor as a $2^{nd}$ degree that is the number of the nodes 42 that are within two edges 44 of the potential monitoring point node, whose betweenness centrality metric is being calculated. Looking at the structure 40, all of nodes a, d, e, f, g, h and j are within two nodes 42 of node i, and therefore the coverage or degree of neighbor value for node i is 7. By identifying the degree of neighbor factor, it can be determined whether node i is a suitable monitoring point in the structure 40 as to whether it is not too far away from too many of the nodes 42. Each of the nodes 42 in the structure 40 will have a degree of neighbor factor identifying its closeness to all of the other nodes 42 in the structure 40, and it is the combination of the betweenness centrality metric and the degree neighbor factor that is used to determine whether a particular node 42 will be the monitoring point.

The betweenness centrality metric is designed to quantify the importance to which a node has control over pair-wise connections between other nodes, based on the assumption that the importance of the connections is equally divided among all of the shortest paths for each pair. The betweenness centrality metric $BC(n_i)$ for a node i∈N, for example, can be the betweenness centrality metric BC(i) for node i, and defined as:

$$BC(i) = \sum_{x \neq i \neq y} \frac{\sigma_{xy}(i)}{\sigma_{xy}} \tag{1}$$

Where $\sigma_{xy}$ is the total number of shortest paths between nodes x and y, and $\sigma_{xy}(i)$ is the number of such shortest paths that pass through node i. The betweenness centrality metric BC(i) can be scaled between 0 and 1 as $$\frac{BC(i)}{(|N|-1)},$$

where |N| is the number of nodes in the graph G.

The designations x and y for the nodes in equation (1), and below, is a node index designation, and can be any of the nodes 42 in the structure 40 in the example above. Particularly, for the value $\sigma_{xy}$, each pair of nodes 42 in the structure 40, the number of paths between those two nodes will be determined, and from those paths, the fewest number of the edges 44 that make up the path. Once the fewest number of the edges 44 is determined between two of the nodes 42, then the calculation determines how many of those different shortest paths there are. Likewise, for the same two of the nodes 42, for the value $\sigma_{xy}(z)$ the number of those shortest paths that pass through the particular node 42 whose betweenness centrality metric is being calculated is determined. The division between those shortest path values is then summed with all of the different shortest path calculations for the node pair combinations to arrive at the betweenness centrality metric for that particular node 42. Calculations are performed for each of the nodes 42, and the node 42 with the highest betweenness centrality metric will likely be the monitoring point for the structure 40 depending on whether it satisfies the desired degree of neighbor factor. For the example shown in FIG. 3, the betweenness centrality metric for all of the nodes a-j can be calculated as: a=0, b=2.333, c=2.333, d=0, e=9.833, f=0, g=0.667, h=9.833, i=14, and j=8.

Correspondingly, the betweenness centrality metric BC(e) for an edge e∈E is defined as the number of the shortest paths passing through the edge e as:

$$BC(e) = \sum_{x \neq i \neq y} \frac{\sigma_{xy}(e)}{\sigma_{xy}} \quad (2)$$

The betweenness centrality metric BC(e) could be normalized between 0 and 1 as:

$$\frac{BC(e)}{[(|N|-1)(|N|-2)]/2} \quad (3)$$

Recognizing the rich semantics in the layered EES network model 20, a multi-partite betweenness centrality metric and a multi-attribute betweenness centrality metric are developed to account for the type and the attributes/roles of the nodes 42 in the layered EES network model 20.

A homogeneous multi-partite betweenness centrality $BC_p(i)$ for the node $i \in N_p$, where $N_p$ is a part, and where $N_p \subset N$ is defined as:

$$BC_p(i) = \sum_{x \neq i \neq y \in N_p} \frac{\sigma_{xy}(i)}{\sigma_{xy}} \quad (4)$$

Where $\sigma_{xy}$ is the number of shortest paths between nodes x and y, given that nodes x, and y are all in the same part $N_p$, and $\sigma_{xy(i)}$ is the number of such shortest paths that pass through node i.

This is to constrain the shortest paths so that the starting and ending nodes are in the same part as one of the intermediate node. For example, an ECU node linked to another ECU node through a gateway ECU with some message nodes along the path.

The constraint in the inverse semantic meaning is defined, where the starting and ending nodes should be different from the part of the intermediate node. An inverse multi-partite betweenness centrality metric $BC_{\bar{p}}(i)$ for node i is defined as:

$$BC_{\bar{p}}(i) = \sum_{x,y \notin N_p, i \in N_p} \frac{\sigma_{xy}(i)}{\sigma_{xy}} \quad (5)$$

Where $\sigma_{xy}$ is the total number of shortest paths between nodes x and y that are in the different part of node i, and $\sigma_{xy}(i)$ is the number of such shortest paths that pass through node i. One example use of this metric is to consider a message node i on the paths of communications between different ECU nodes.

A designated multi-partite betweenness centrality metric $BC_{\hat{p}}(i)$ is defined for node i as:

$$BC_{\hat{p}}(i) = \sum_{x \in N_O, i \in N_P, y \in N_Q} \frac{\sigma_{xy}(i)}{\sigma_{xy}} \quad (6)$$

Where $\sigma_{hj}$ is the number of shortest paths between nodes x and y that are in different parts and not in the same part ($N_O \neq N_P \neq N_Q$) as node i, and $\sigma_{xy}(i)$ is the number of such shortest paths that pass through node i. This assumes that there are at least three parts defined in the network model 20. One example use of such a metric could be finding out the betweenness centrality metric for a node in the functional layer 26 and the starting and ending nodes are in the message layer 28 and the physical network layer 24.

To account for attributes orthogonal to a topological definition of parts, a homogeneous multi-attribute betweenness centrality metric $BC_A(i,\alpha)$ and an inverse multi-attribute betweenness centrality metric $BC_{\bar{A}}(i, \alpha)$ are defined for node $i \in N$ and an attribute $\alpha \in A_N$ as:

$$BC_A(i, a) = \sum_{x \neq i \neq y, a(x), a(i) \neq a(y)} \frac{\sigma_{xy}(i)}{\sigma_{xy}} \quad (7)$$

Where $\sigma_{xy}$ is the total number of shortest paths between nodes x and y, given that nodes x, i and y have the same values for the attribute (i.e., $\alpha(x)=\alpha(i)=\alpha(y)$), and $\sigma_{xy}(i)$ is the number of such shortest paths that pass through node i, and:

$$BC_{\bar{A}}(i, a) = \sum_{x \neq i \neq y, a(x)=a(y), a(i) \neq a(y)} \frac{\sigma_{xy}(i)}{\sigma_{xy}} \quad (8)$$

Where $\sigma_{xy}$ is the total number of shortest paths between nodes x and y, given nodes x and y have the same values for the attribute $\alpha$ (i.e., $\alpha(x)=\alpha(y)$), but they have different values from node i (i.e., $\alpha(i) \neq \alpha(y)$), and $\sigma_{xy}(i)$ is the number of such shortest paths that pass through node i.

Similarly, the multi-attribute betweenness centrality metric $BC_A(e, \alpha)$ and $BC_{\bar{A}}(e, \alpha)$ for an edge e∈E for an attribute $\alpha \in A_E$, can be defined as those for the nodes 42. One example use of multi-attribute betweenness centrality metric is the attributes of an ECU, such as the "role" which can have the attribute value "receiving" or "sending" for different messages.

In addition to quantifying the importance of a node or an edge in the network model 20 using the betweenness centrality metric, the betweenness centrality metric for every target in the network model 20 is computed to derive a distribution of the betweenness centrality metrics. Descriptive statistics, such as average, percentile, variance, skewness, etc., are calculated to characterize the betweenness centrality metric distribution. This characterization can help in quantifying the complexity of the layered EES network model 20. For example, a centralized design of the EES 12 may have quite a different betweenness centrality metric distribution from the one with the distributed design.

To improve system maintainability, more resources can potentially be put in to the system to improve the reliability of the targets with a high betweenness centrality metric, or to increase the diagnostic coverage for targets with a low betweenness centrality metric. Such a trade-off analysis for improving design of maintainability could be potentially enabled by the distribution of the betweenness centrality metric.

The fault detection and isolation process discussed requires actively monitoring a system and its operation. As the layered EES network model 20 provides the physical, structural, functional and behavioral aspects of the EES 12, the operational status of the EES 12 can be considered as power/signal/information flow over the layered EES network model 20. The layered EES network model 20 can be considered as a platform for simulating the operations of the EES 12. However, it is unlikely to simulate the EES 12 for all possible combinations of the input signals, especially in the wide ranges of different and unforeseeable operational environments in the field.

Rather than expect exhaustive simulations of the EES 12, the present invention proposes to use the distribution of the betweenness centrality metrics as the basis for setting up the monitoring points for fault-detection and isolation. Given the distribution of the betweenness centrality metrics, the FIMA system performs the steps of computing the betweenness centrality metric for all of the nodes; sorting all of the nodes in descending order according to their betweenness centrality metric; adding the node with the highest betweenness centrality metric in all of its first and second degree neighbor factors to be valid to the visited set; adding a new entry to the subsets map where the key is the edit node and the value is the list of its added neighbor; if the size of the visited set is less than the given coverage criteria and percentile, returning to the step of adding the node with the highest betweenness centrality; and using those nodes that are the keys of the subset map as fault detection and isolation monitoring points.

The in-vehicle EES 12 is essentially an embedded and distributed computing platform that is subject to the design for fault-mitigation. To support fault-mitigation analysis, two sequential failure strategies are introduced that simulate the failure of selected targets to show how the layered EES network model 20 is fragmented. Based on the betweenness centrality metric, the failure responses are quantified and recommendations are made about how the surviving targets could potentially implement the functionality of failed targets, and how the monitoring points for fault detection and isolation should be altered in response to such sequential failures.

After loading the layered EES network model 20, the system performs the following steps for fault-mitigation analysis: (1) the user selects the desired betweenness centrality metric to be used, the target type and the failure strategy; (2) the algorithm computes and ranks the betweenness centrality metric for all of the targets; (3) the algorithm selects which targets to fail next using the selected failure strategy; (4) the algorithm simulates the failures by removing the selected targets; (5) the algorithm computes and ranks the betweenness centrality metrics for the surviving targets; (6) for each survived target, the algorithm computes and ranks the difference of the betweenness centrality metric before and after the simulated failure; (7) the algorithm checks that the simulation reaches the completion criteria; and if not, (8) the algorithm goes back to step three, and if yes, the algorithm computes an output fault detection, isolation mitigation analysis results.

For the failure strategy in step (1), the present invention proposes two options, namely a usage-based and a random failure strategy. For the usage-based failure strategy, the present invention deterministically fails the target with the highest rank of the betweenness centrality metric by assuming that the most used target is most likely to fail. Alternatively, randomness is introduced into the usage-based failure strategy by failing the target according to the distribution and its betweenness centrality metric. For the random failure strategy, the target is failed randomly according to an uniform distribution.

In step (6), the system quantifies how the failed targets influence the importance of a survived target in controlling pair-wise connections. The change of the betweenness centrality metric is computed, ranked and recorded for each failure simulation. This will serve as the basis of sequential fault-isolation analysis in step (8).

In step (7), the system uses various criteria to decide if the simulation is completed. For example, the simulation is stopped when all of the betweenness centrality metrics scores are zero or upon initial fragmentation of the network, such as when the graph becomes disconnected.

After the failure simulation is completed, step (8) takes the distribution of the betweenness centrality metrics resulting from the simulated sequence failures to make recommendations for fault detection, isolation, and mitigation analysis. Three different analyses could be performed for fault detection and isolations. First, for the usage-based failure strategy, the selected targets can be used for sequence failure as the monitoring points for fault-isolations because they are the next to fail according to the assumption of the usage-based failure strategy. Second, a new FDI monitoring point is employed for systems after each simulated failure using the procedures outlined above. Third, survived targets are grouped using the positive and negative changes in the betweenness centrality metrics before and after each failure simulation. The group with positive changes in the betweeness centrality metric indicate that they have gained importance, whereas the group with the negative changes in the betweeness centrality metric indicate the loss of their importance. The mean and variance of changes could be computed in the distributions to quantify the effects of simulated failures.

In the fault-mitigation analysis, it is desirable to quantify how vulnerable the layered EES network model 20 is with respect to failure types. The present invention proposes using two measures to quantify such vulnerability, including the threshold of the dissolving giant component to quantify network fragmentations that may result in the loss of the ability in executing fault-mitigation operation. Also, the mean of the normalized betweenness centrality metric could be used to quantify the gradual changes of the betweeness centrality metric and its sequential failures.

A giant component is a connected sub-network that contains a majority of the entire network nodes. Since nodes in the giant component can reach each other, this warrants the potential for executing fault-mitigation operations. However, when failures are induced, edges are removed from the failed nodes. This may lead to network fragmentation which in turn dissolves the giant component. As a result, fault-mitigation operation could not be executed to reach those failed nodes in the network. Hence, the vulnerability of the layered EES network model 20 can be evaluated by considering how many failures are needed for a given failure strategy, usage-based or random, to reach a threshold value, such as 75% of the nodes that remain in the giant component, of dissolving the giant component.

Next, the gradual effect of sequential failures can be quantified using the mean of the normalized betweenness centrality metric. This measure is useful even before the giant component reaches its dissolving threshold. By definition, nodes in two different fragmented subsets will not have the shortest paths between them. This will lead to the decreasing of the mean of the normalized betweenness centrality metric for the whole network as sequential failures progress.

Finally, since the FIMA system has recorded all survival network fragments for each simulated sequential failures, further recommendations can be made on which nodes could potentially be a burden to implement fault-mitigation functions of failed nodes. The simplest heuristic would be using the neighbors of targeting failing nodes to carry out the function. Such heuristic may not be viable for usage-based strategy as the failing node is the one that highest importance for pair-wise connections. The heuristic could be adapted for having every second highest importance nodes of the survived network fragments to carry out the function of the failing nodes. This heuristic will avoid immediate sequential failing and at the same time carry out the function of failing nodes that need to be set on many shortest paths.

Figure 4:
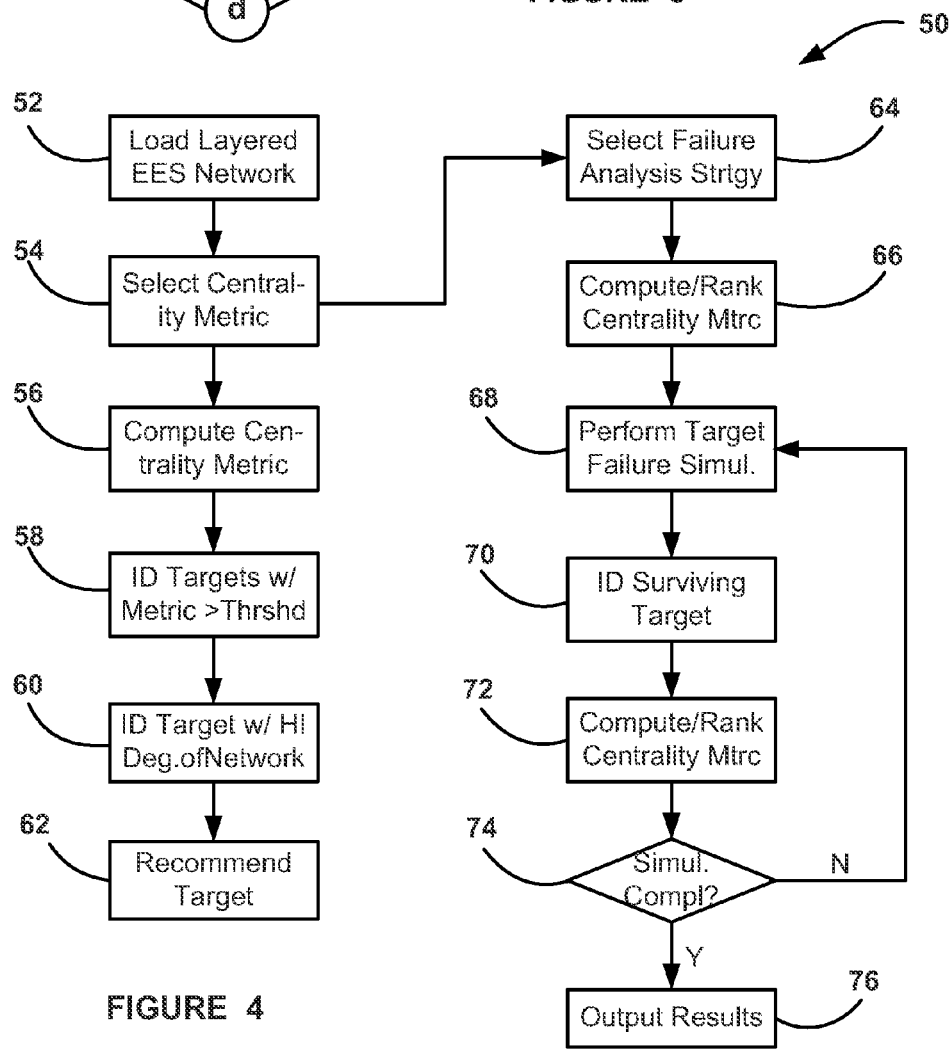
FIG. 4 is a flow chart diagram showing a process for identifying a suitable monitoring point in the node structure based on a betweenness centrality metric of each node.

FIG. 4 is a flow chart diagram 50 showing a process for performing the methodology for identifying a monitoring point using a betweeness centrality metric as discussed above. In this discussion, the targets are nodes, such as an ECU, messages or other entities, or edges, such as relationships among nodes, in an EES layered network, such as the network model 20. The algorithm loads the EES layered network at box 52. The user selects the particular betweenness centrality metric to be used at box 54. The betweenness centrality metric can be any one of the multi-partite betweenness centrality metric, the multi-attribute betweenness centrality metric, the betweenness centrality metric for an edge, the inverse multi-partite betweenness centrality metric and the inverse multi-attribute betweenness centrality metric. The algorithm then computes the selected betweenness centrality metric at box 56 for each target in the particular network that has been loaded. The algorithm then identifies which of the targets has a betweenness centrality metric above a predetermined minimum betweenness centrality threshold that is calibrated for the particular network at box 58. The algorithm then determines which of the identified highest ranking targets having a betweenness centrality metric above the threshold has a degree of neighbor factor that provides the desired coverage for the entire network at box 60. If none of the highest ranking targets meet the degree of neighbor criteria, then the algorithm returns to the box 58 to lower the threshold value so that more targets are captured in the ranking. Once the highest ranking target with the desired degree of neighbor factor is determined, the algorithm recommends that target as the monitoring point at box 62.

For fault-mitigation analysis, the FIMA algorithm performs failure simulation using selected failure strategies of usage-based or random failures. After the betweenness centrality metric is selected at the box 54, the algorithm selects a failure analysis strategy at box 64, and computes and ranks the betweenness centrality metric for the targets at box 66. The algorithm then performs the selected target failure simulation at box 68. After the target failure simulation for each node, the algorithm identifies the surviving target and re-computes and re-ranks the betweenness centrality metric for the targets at box 70. The algorithm computes and ranks the betweenness centrality metrics and ranks the targets at box 72. The algorithm then determines if the simulation has been completed at decision diamond 74, and if so, the FIMA algorithm outputs the final fault-isolation and fault-mitigation analysis results, after the simulation completion criteria is met at box 76. Otherwise, the algorithm returns to the box 68 to continue with the simulation.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for identifying an information monitoring point in an electrical and electronic system (EES) on a vehicle, said method comprising:
    defining a network model of the EES where potential monitoring points in the model are identified as targets;
    determining, using a microprocessor, a betweenness centrality metric for each target in the model as a summation of a ratio of a number of shortest paths between each pair of targets in the model that pass through the target whose betweenness centrality metric is being determined to a total number of shortest paths between each pair of targets;
    selecting a minimum betweenness centrality metric threshold;
    identifying which of the determined betweenness centrality metrics for each of the targets is greater than the threshold;
    defining a minimum degree of neighbor factor that defines a predetermined coverage of a target relative to all of the other targets;
    determining which of the targets having a betweenness centrality metric greater than the threshold has a degree of neighbor factor greater than the minimum degree of neighbor factor; and
    identifying a target, from the determined targets having a betweenness centrality metric greater than the threshold and having a degree of neighbor factor greater than the minimum degree of neighbor factor, that has the highest betweenness centrality metric as the information monitoring point.

2. The method according to claim 1 wherein the model includes nodes that are selected from the group consisting of electronic control units and software components, and edges that are connections between the nodes.

3. The method according to claim 2 wherein the targets include edges in the network model.

4. The method according to claim 2 wherein the targets include nodes in the network model.

5. The method according to claim 1 wherein the network model is a layered model.

6. The method according to claim 5 wherein the network model includes a data flow network layer, a message network layer, a functional network layer, a physical network layer and an electrical network layer.

7. The method according to claim 1 wherein the betweenness centrality metric is a homogenous multi-partite betweenness centrality metric, an inverse multi-partite betweenness centrality metric, a designated multi-partite betweenness centrality metric, a homogenous multi-attribute betweenness centrality metric, an inverse multi-attribute betweenness centrality metric or an edge betweenness centrality metric.

8. The method according to claim 1 wherein the minimum degree of neighbor factor is a second degree of neighbor factor where a particular target is within two connections of another target.

9. The method according to claim 1 further comprising reducing the minimum betweenness centrality metric threshold if none of the targets satisfies the predetermined coverage provided by the minimum degree of neighbor factor.

10. The method according to claim 1 further comprising performing a target failure simulation for each target to determine whether a target has failed.

11. A method for identifying an information monitoring point in an electrical and electronic system (EES) on a vehicle, said method comprising:
- defining a layered network model of the EES that includes nodes identifying one or more of electronic control units and software components in the EES;
- determining, using a microprocessor, a betweenness centrality metric for each node in the model as a summation of a ratio of a number of shortest paths between each pair of nodes in the model that pass through the node whose betweenness centrality metric is being determined to a total number of shortest paths between each pair of nodes;
- selecting a minimum betweenness centrality metric threshold;
- identifying those nodes having a determined betweenness centrality metric is greater than the threshold to be potential monitoring points;
- defining a minimum degree of neighbor factor that defines a predetermined coverage of a node relative to all of the other nodes; and
- identifying one of the potential monitoring points which has a degree of neighbor factor greater than the minimum degree of neighbor factor and has a highest betweenness centrality metric as the information monitoring point.

12. The method according to claim 11 wherein the minimum degree of neighbor factor is a second degree of neighbor factor where a particular node is within two connections of another node.

13. The method according to claim 11 wherein the betweenness centrality metric is a homogenous multi-partite betweenness centrality metric, an inverse multi-partite betweenness centrality metric, a designated multi-partite betweenness centrality metric, a homogenous multi-attribute betweenness centrality metric, an inverse multi-attribute betweenness centrality metric or an edge betweenness centrality metric.

14. A system for identifying an information monitoring point in an electrical and electronic system (EES) on a vehicle, said system comprising:
- a microprocessor coupled to a memory, where said microprocessor is configured with an algorithm, said algorithm including:
- defining a network model of the EES where potential monitoring points in the model are identified as targets;
- determining a betweenness centrality metric for each target in the model as a summation of a ratio of a number of shortest paths between each pair of targets in the model that pass through the target whose betweenness centrality metric is being determined to a total number of shortest paths between each pair of targets;
- selecting a minimum betweenness centrality metric threshold;
- identifying which of the determined betweenness centrality metrics for each of the targets is greater than the threshold;
- defining a minimum degree of neighbor factor that defines a predetermined coverage of a target relative to all of the other targets;
- determining which of the targets having a betweenness centrality metric greater than the threshold has a degree of neighbor factor greater than the minimum degree of neighbor factor; and
- identifying a target, from the determined targets having a betweenness centrality metric greater than the threshold and having a degree of neighbor factor greater than the minimum degree of neighbor factor, that has the highest betweenness centrality metric as the information monitoring point.

15. The system according to claim 14 wherein defining a network model of the EES defines a model including nodes that are selected from the group consisting of electronic control units and software components, and edges that are connections between the nodes.

16. The system according to claim 15 wherein the targets include edges in the network model.

17. The system according to claim 15 wherein the targets include nodes in the network model.

18. The system according to claim 14 wherein determining a betweenness centrality metric selects the betweenness centrality metric as a homogenous multi-partite betweenness centrality metric, an inverse multi-partite betweenness centrality metric, a designated multi-partite betweenness centrality metric, a homogenous multi-attribute betweenness centrality metric, an inverse multi-attribute betweenness centrality metric or an edge betweenness centrality metric.

19. The system according to claim 14 wherein defining a minimum degree of neighbor factor defines the minimum degree of neighbor factor as a second degree of neighbor factor where a particular target is within two connections of another target.

* * * * *